United States Patent [19]
Hammond

[11] 3,864,618
[45] Feb. 4, 1975

[54] ELECTRO-MECHANICAL VIBRATORY DRIVE CONTROL

[75] Inventor: Peter W. Hammond, Chagrin Falls, Ohio

[73] Assignee: MEM Controls, Inc., Wickliffe, Ohio

[22] Filed: Nov. 13, 1972

[21] Appl. No.: 305,982

[52] U.S. Cl. ............... 321/9 A, 307/254, 318/227, 321/18, 321/45 R
[51] Int. Cl. ........................................... H02m 7/00
[58] Field of Search .... 307/253, 254; 321/18, 45 R, 321/9 A, 44; 318/227

[56] References Cited
UNITED STATES PATENTS

| | | | |
|---|---|---|---|
| 3,257,604 | 6/1966 | Colclaser et al. | 321/45 R |
| 3,364,413 | 1/1968 | Abraham | 321/18 |
| 3,408,551 | 10/1968 | Kuba | 321/45 R X |
| 3,409,817 | 11/1968 | Gillett | 321/9 A |
| 3,423,663 | 1/1969 | Payne | 321/45 R X |
| 3,594,623 | 7/1971 | Lamaster | 318/227 |
| 3,614,590 | 10/1971 | Kernick | 321/9 A |
| 3,694,732 | 9/1972 | Nollace | 321/45 R |
| 3,710,229 | 1/1973 | Jessee | 321/45 R |
| 3,713,013 | 1/1973 | Phillips et al. | 321/45 R |
| 3,793,578 | 2/1974 | Rettig | 321/44 |

FOREIGN PATENTS OR APPLICATIONS 20,138   7/1965   Japan ............................ 321/45 R Primary Examiner—R. N. Envall, Jr.
Attorney, Agent, or Firm—Donnelly, Maky, Renner & Otto

[57] ABSTRACT

A variable frequency electrical power supply circuit includes a power circuit that provides a drive signal to energize a load and a control circuit that controls application of the drive signal to the load. The load may be an electro-magnetic or electro-mechanical device, such as a solenoid to provide in response to the drive signal a motive force to a mechanical apparatus for causing resonant vibratory motion therein. The power supply circuit may be self tuning to the resonant frequency of the mechanical apparatus or may be manually tunable.

20 Claims, 9 Drawing Figures

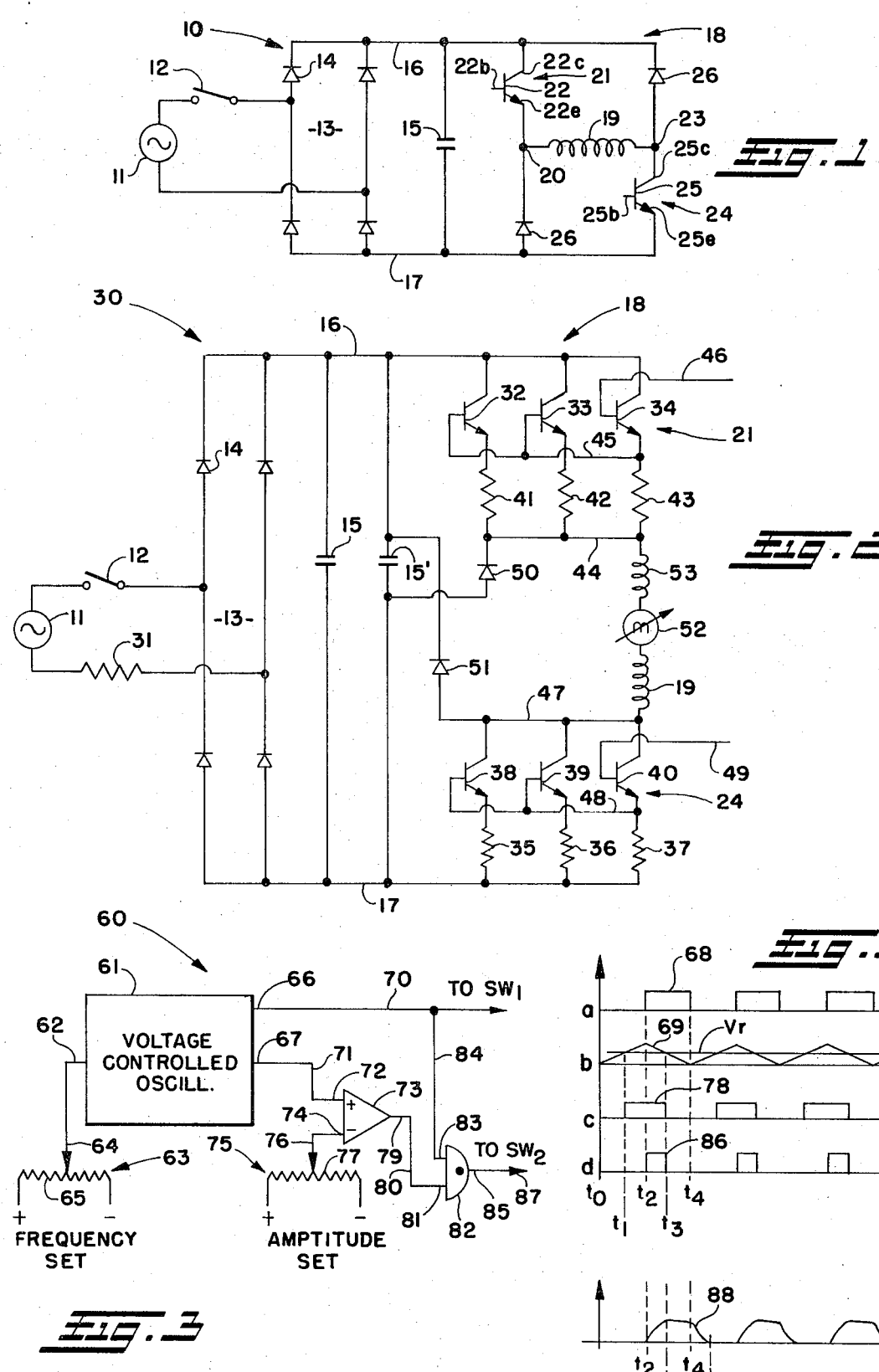

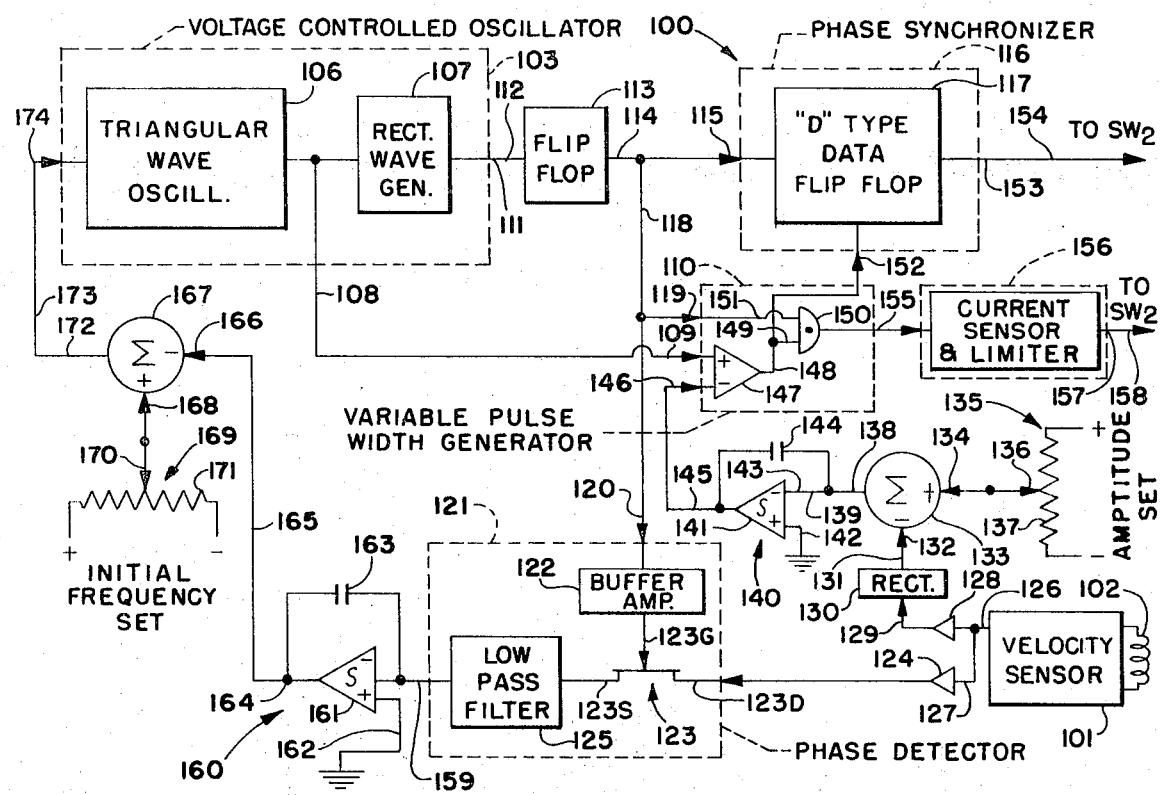
Fig. 6
Fig. 7
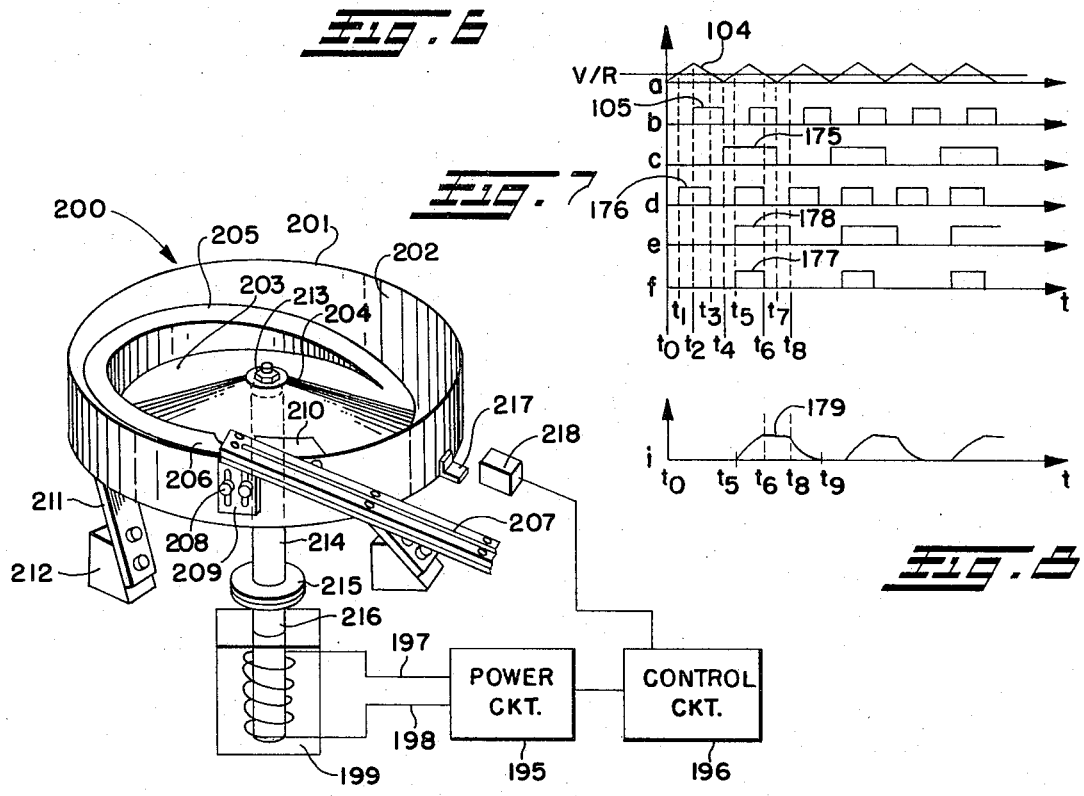
Fig. 8
Fig. 9

ELECTRO-MECHANICAL VIBRATORY DRIVE CONTROL

BACKGROUND OF THE INVENTION

Electro-mechanical systems including a power supply and a drive mechanism, such as a solenoid coil with a movable core, have been used for driving and vibrating mechanical devices at resonance for various purposes, for example in vibratory feeder devices, mechanical testing devices, etc. While such prior electro-mechanical systems have been effective at the designed resonant frequency of each respective system and device, such systems have been inefficient and often ineffective when the resonant frequency of the mechanical device would change from the designed resonant frequency, for example as parts wear, spring constants change, and masses vary in magnitude and location.

SUMMARY OF THE INVENTION

Accordingly, a primary object of the invention is to provide a variable frequency electrical power supply for an electro-mechanical system.

A further object of the invention is to provide a variable frequency electrical power supply for an electro-mechanical system wherein the frequency of the power supply is tunable to the mechanical resonant frequency of an associated mechanical device.

Another object of the invention is to provide a variable frequency electrical power supply for an electro-mechanical system that supplies driving power for a mechanical device wherein the power supply is automatically tunable to the mechanical resonant frequency of the mechanical device.

An additional object of the invention is to provide a variable frequency power supply for supplying electrical energy to a driving element in a vibratory feeder device to maintain resonant vibration and operation of the device.

A still further object of this invention is to provide a variable frequency electrical power supply for supplying a drive signal to an electro-mechanical system to produce vibratory motion in a device, for sensing the motion of the device, and for automatically adjusting the drive signal to produce and to maintain resonant vibratory motion in the device.

Still another object of the invention is to provide an improved power circuit for supplying a drive signal to an electro-mechanical device.

Still an additional object of the invention is to provide an improved control circuit for controlling operation of a power circuit that supplies a drive signal to an electro-mechanical device.

Yet a further object of the invention is to provide a power circuit for periodically energizing an inductive load and for recovering energy from the inductive load.

These and other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but several of the various ways in which the principals of the invention may be employed.

BRIEF DESCRIPTION OF THE DRAWING

In the annexed drawing:

FIG. 1 is a schematic electric circuit diagram of a power circuit in accordance with the invention;

FIG. 2 is a schematic electric circuit diagram of a modified power circuit in accordance with the invention;

FIG. 3 is a block circuit diagram of a manually adjustable control circuit for controlling the power circuits in FIGS. 1 and 2 in accordance with the invention;

FIG. 4 is a graph illustrating representative wave forms of the signals developed in the control circuit of FIG. 3;

FIG. 5 is a graph illustrating the representative wave form of the current drive signal through the load in the power circuits of FIGS. 1 and 2;

FIG. 6 is a circuit diagram partially in block form of an automatic tuning control circuit for controlling the power circuits in FIGS. 1 and 2 in accordance with the invention;

FIG. 7 is a graph illustrating representative wave forms of the signals developed in the automatic tuning control circuit of FIG. 6;

FIG. 8 is a graph illustrating another representative wave form of the current drive signal through the load in the power circuits of FIGS. 1 and 2; and FIG. 9 is an isometric view, schematically illustrating a vibratory feeder apparatus.

DESCRIPTION OF THE PREFERRED EMBODIMENT

Referring now to the drawings wherein like reference numerals refer to like elements in the several figures, the invention will be described hereinafter for illustrative purposes as a variable frequency power supply circuit for providing driving power or motive force to a well known vibratory feeder device including a power circuit and a control circuit for controlling operation of the power circuit, although the invention may be used with other mechanical devices requiring a periodically varying input driving signal and especially where the driving signal produces a force applied to the mechanical device to establish and to maintain resonant vibrations therein. One type of vibratory feeder includes a spring mounted feeder bowl having a generally planar horizontal bottom and a cylindrical side wall. A helical ramp is formed along the inside of the side wall extending from the bottom of the bowl to the top of the wall, and a vibratory motive force applied to the bowl produces slight vertical and rotational movement against the spring mountings to urge parts, such as screws, in the bowl to travel up the ramp for discharge from the bowl. In such a vibratory feeder the motive force may be produced by a solenoid drive coil, and the instant invention including the power and control circuits are described hereinafter to supply a periodic drive signal electric current to such an electro-magnetic coil inductive load, although other loads may also be used.

A power circuit 10, shown schematically in FIG. 1, includes an alternating current electric power source 11 coupled by a main switch 12, which may be for example a circuit breaker or fused switch, to a full wave rectifier circuit 13 including four diodes 14 with a smoothing capacitor 15 coupled across the output of the rectifier circuit to provide a positive line 16 and a negative line 17, although a direct current power supply may alternatively be used. The power circuit 10 also includes a controlled portion 18 for energizing an inductive load 19, which may be an electric coil having windings that produce a magnetic field upon energization thereof for displacing a central core to provide motive force to a vibratory feeder. The load 19 has a first terminal 20 connected to the positive line 16 of the power circuit 10 by a first controlled switch 21, for example a transistor 22 that may be periodically energized for saturation to full conduction, and a second terminal 23 connected to the negative line 17 by a second controlled switch 24, for example another transistor 25 periodically energizable for saturation to full conduction. Reverse poled or biased diodes 26 also connect the load 19 to the respective positive and negative lines of the power circuit 10 to permit energy stored in the load 19 to flow therethrough when one of the controlled switches becomes non-conducting as will become more apparent as the description proceeds. While prior power circuits for energizing inductive load have generally required four controlled switchng devices, the instant power circuit permits the use of only two controlled switches and two diodes because of the unidirectional current flow through the inductive load which will be described in more detail below.

The power circuit 10 is energized by the power source 11 upon closure of the switch 12 to produce by the rectifier circuit 13 and the capacitor 15 a positive voltage on the line 16 and relative negative voltage on the line 17 in conventional manner. Initially the transistors 22, 25 are not conducting, effectively being open switches, and the diodes 26 are reverse biased preventing current flow therethrough; and therefore the load 19 is not energized.

Upon receipt of proper control signals at the bases 22b, 25b, to energize the transistors, saturating or at least causing same to conduct relatively efficiently, a drive signal electric current flows from the collectors 22c, 25c to the emitters 22e, 25e as well as through the load 19, the drive signal increasing in magnitude while both transistors are on and producing in the coil load a magnetic force applied to the movable core element thereof to produce a motive force on the vibratory feeder as described above. When one of the transistors 22 or 25 is deenergized by elimination of the control signal thereto, the transistor stops conducting current, but the drive signal through the load 19 remains substantially at the constant level attained, flowing in the circuit loop formed by the load itself, the still energized transistor, and the properly poled one of the diodes 26, as an inductive load tends to resist instantaneous current changes. After the other transistor id de-energized, the load 19 is coupled across the capacitor 15 by the diodes 26 and any electric energy stored in the load will then be recovered and stored in the capacitor as the drive signal rapidly decreases to zero. As the drive signal ceases, the magnetic force produced on the movable core in the coil load also ceases permitting same to return to its de-energized position allowing the spring mountings of the vibratory feeder to return to their relaxed state.

Referring now to FIG. 2, a modified power circuit 30 is shown including an alternating current source 11 coupled by a switch 12 and a current limiting resistor 31 to a full wave rectifier circuit 13 formed by the diodes 14 with smoothing capacitors 15, 15' connected across the output of the rectifier circuit to produce a positive line 16 and a relative negative line 17. A controlled portion 18 of the power circuit 30 includes a first controlled switch 21, such as transistors 32, 33, 34, forming a first transistor group connected to the positive line 16 and a second controlled switch 24 connected to the negative line 17 through the resistors 35, 36, 37, the second controlled switch being for example the transistors 38, 39, 40 forming a second transistor group. The emitters of transistors 32, 33, 34 are connected through resistors 41, 42, 43 to a conductor 44, and the bases of transistors 32, 33 are connected by conductor 45 to the emitter of the transistor 34. The base of the transistor 34 is connected to a conductor 46 on which one of the two control signals to the power circuit 30 may be impressed. The collectors of the transistors 38, 39, 40 are connected to a conductor 47 and the bases of the transistors 38, 39 are connected by a conductor 48 to the emitter of the transistor 40. The base of the transistor 40 is connected to a conductor 49 on which the other of the two control signals to the power circuit 30 may be impressed. Diodes 50, 51 connect the respective conductors 44, 47 to opposite sides of the capacitor 15', i.e., to the lines 16, 17; and the load 19, for example an inductive electric coil as described above, is connected together with a meter 52 and a current limiting inductor 53 across the conductors 44, 47. Although the transistors 21, 24 in the power circuit 10 have been replaced in the power circuit 30 by two groups of transistors for increased power capability and an additional capacitor has been added for the same reason, the number of transistors in each group may be varied depending on the type of transistor or switch used and on circuit power requirements, and similarly the number of capacitors may also be varied.

In operating the power circuit 30 direct current electric power is applied to the lines 16, 17 and upon receipt of the control signals on the conductors 46, 49, the transistors 34, 40 are energized for saturation to full conduction or at least to conduct relatively efficiently permitting current flow therethrough, which current energizes the respective transistors 32, 33 as well as the transistors 38, 39. The drive signal electric current then flows from the positive line 16 through the transistors 32, 33, 34; resistors 41, 42, 43; conductor 44; current limiting inductor 53; meter 52; load 19; conductor 47; transistors 38, 39, 40; and resistors 35, 36, 37 to the negative line 17. While both controlled switches 21, 24, i.e., groups of transistors, are conducting, the drive signal current flow through the load 18 increases in well known manner according to the proper circuit L/R time constant.

When one of the control signals ceases, for example that applied on the conductor 49, the transistors 38, 39, 40 are deenergized and become non-conductive, and the drive signal stops increasing and remains at a substantially constant amplitude because the inductive load 19 resists current changes. At this time the constant amplitude drive signal current flows through the load 19 around the closed circuit loop formed by the conductor 47; diode 51; transistors 32, 33, 34; resistors 41, 42, 43; conductor 44, inductor 53; and meter 52, according to Kirchoff's law. When the other control signal ceases, the other group of transistors are deenergized and becomes non-conductive, and drive signal current through the load 19 rapidly decreases to zero according to the proper circuit L/R circuit time constant, the energy stored in the inductive load when the other control signal ceases being recovered in the capacitors 15, 15' as described above.

While the foregoing description refers to both control signals occurring simultaneously with that applied at the conductor 49 first ceasing, the power circuit 30 would operate similarly if the control signal applied at the conductor 46 were first to cease. Also, it is, of course, not necessary that both control signals occur simultaneously nor that they cease at different times; the only criterion regarding the control signals is that for some period of time both control signals must be "on" to permit a drive signal electric current to energize the load 19.

A manually operated control circuit 60 for supplying the first and second control signals to the controlled switches 21, 24 in the power circuits is shown in FIG. 3, and a graph representing the signal wave forms as magnitudes with respect to time at various points in the control circuit is shown in FIG. 4. The control circuit 60 includes a variable frequency oscillator, such as for example a voltage controlled oscillator 61, which may be a well known device that produces an output signal or signals at a frequency dependent on the voltage applied to the input thereof, such as Model 111 VCG sold by Wavetek of San Diego, California. An input 62 to the voltage controlled oscillator is connected, for example, to a frequency setting potentiometer 63, connected across a suitable voltage source (not shown), at the adjustable wiper 64 thereof; and the frequency of the output signals from the oscillator are dependent on the position of the wiper on a resistor portion 65 of the potentiometer.

The voltage controlled oscillator 61 produces two output signals at the outputs 66 and 67 thereof, viz. a rectangular wave output signal 68 (FIG. 4a) on the former and a triangular wave output signal 69 (FIG. 4b) on the latter. The first output 66 from the voltage controlled oscillator is connected by a conductor 70 to one of the controlled switches, for example switch 21, in the power circuits to provide the rectangular wave signal 68 thereto as the first control signal and the second output 67 is connected by a conductor 71 to a first input 72 of a well known comparator circuit 73 providing the triangular wave signal 69 thereto. A second input 74 to the comparator is connected to an amplitude setting potentiometer 75 at the movable wiper 76 thereof which is adjustable over a resistor portion 77 coupled across a suitable voltage source (not shown) to produce a voltage level reference signal V$r$ (FIG. 4b). The comparator 73, may be, for example, an operational amplifier having nearly infinite gain, whereby when the sum of the inputs is positive the comparator is saturated and produces a positive signal, and when the sum of the inputs is negative the comparator produces a zero or negative signal; and the varying output signal 78 from the comparator is shown in FIG. 4c. The output 79 from the comparator 73 is coupled by a conductor 80 to one input 81 of a well known AND gate 82 forming therewith a variable pulse width generator with the other input 83 thereof connected by a conductor 84 to the conductor 70; and the AND gate has an output 85 on which the signal 86 (FIG. 4d) is produced coupled by a conductor 87 to the other controlled switch 24 in the power circuit for providing the second control signal. A primary electric power supply (not shown) provides electric energy for the control circuit 60. For convenience, reference to a signal as occurring implies that a positive pulse or portion thereof is occurring; and reference to a signal as not occurring implies that said positive pulse is not occurring and, in fact, a zero or negative pulse is occurring.

Operation of the control circuit 60, which will be described hereinafter with reference to the wave forms shown in FIG. 4, is commenced by energizing the circuit with the power supply and adjusting the potentiometer 63 to provide a voltage level signal to the input 62 of the voltage controlled oscillator 61. The voltage controlled oscillator then produces in known manner the rectangular wave signal 68 (FIG. 4a) on the conductor 70 and the triangular wave signal 69 (FIG. 4b) on the conductor 71, the frequency of the two output signals being identical and dependent on the setting of the potentiometer 63, and the phase relation therebetween remaining constant. In the preferred embodiment a logical "1" or positive pulse or portion of the rectangular wave signal implies that the triangular wave signal is "going down" or decreasing in magnitude, and a zero or negative pulse or portion of the former implies that the latter is "rising." The rectangular wave signal 68 is applied in known manner as the first control signal to the controlled switch 21, for example to control operation of the transistor 22 or the first transistor group in the respective power circuits, causing same periodically to conduct the drive signal current therethrough.

The triangular wave signal 69 (FIG. 4b) from the voltage controlled oscillator 61, which is preferably clamped in known manner within the oscillator to oscillate between "ground" and maximum amplitude, is compared in the comparator 73 with the reference voltage signal V$r$, developed at the potentiometer 75. The amplitude of the signal V$r$ determines the maximum amplitude of the drive signal in the load 19 in the power circuit as will become more apparent below. An output signal 78 (FIG. 4c) from the comparator 73 has a positive going portion or pulse when the triangular wave signal 69 is greater in magnitude than the signal V$r$ and a zero or negative going portion or pulse when the signal V$r$ is greater in magnitude than the triangular wave signal. The comparator output signal 78 is applied to the input 81 of the AND gate 82 which receives the rectangular wave signal 68 at the other input 83; and when both input signals occur being "on" or positive, an output positive pulse signal 86 (FIG. 4d) results at the output 85 thereof as the other control signal for application to the controlled switch 24, for example to control energization of the second transistor 25 or transistor group in the respective power circuits.

The wave form 88 of the drive signal electric current flowing through the load 19 is illustrated in FIG. 5 representing current magnitude with respect to time, the graph being aligned with those in FIG. 4 to facilitate comparison therewith. The frequency of the drive signal 88 in the load 18 is normally the same as the frequency of the output signals from the voltage controlled oscillator 61, as can be seen in FIGS. 4a and 4b, and FIG. 5. The maximum amplitude of the triangular wave signal 69 (FIG. 4b) from the voltage controlled oscillator 61 is normally constant; and, accordingly, for a given frequency of the triangular wave signal the pulse width of the comparator 73 output signal 78 (FIG. 4c) is determined only by the magnitude of the signal Vr as set on the amplitude setting potentiometer 75. As the rectangular signal 68 is maintained at a relatively constant frequency controlled only by the input 62 to the voltage controlled oscillator 61, the signal Vr controls the time duration that both power circuit transistors or transistor groups are energized and conducting as governed by the AND gate 82, which is the duration of time that current magnitude increases in the load 19 as described above.

In FIGS. 4 and 5 the triangular signal 69 begins at time $t_0$ and becomes greater than the signal Vr beginning at time $t_1$, which is the time that the comparator 73 output pulse 78 begins. At time $t_2$ the triangular signal begins decreasing in magnitude and the rectangular signal 68 begins, permitting an output signal 86 from the AND gate 82, the signals 68 and 86 being the control signals to turn on both power circuit transistors or transistor groups until time $t_3$ when the triangular signal 69 becomes less than the signal Vr, which turns of the comparator 73 output signal 78 and the AND gate output signal 86. The drive signal current 88 (FIG. 5) in the load therefore increases between time $t_2$ and time $t_3$ at a rate determined by the proper circuit L/R time constant, maintains a substantially constant level between time $t_3$ and time $t_4$ at which point the rectangular signal 68 ceases, and decreases rapidly to zero between time $t_4$ and time $t_5$ also at a rate determined by the proper circuit L/R time constant, with the various signals periodically occurring on a continuing basis while the control and power circuits are energized. For tuning the control circuit 60 to energize the power circuit to produce resonant motion in the vibratory feeder, a simple adjustment of the frequency setting potentiometer 63 controls the frequency of the oscillator output signals, therefore controlling the drive signal 88 frequency and the motive force transmitted to the feeder. The amplitude of vibration is adjusted by the potentiometer 75 which determines the time that both transistors are on to control the maximum amplitude of the drive signal.

Referring now to FIG. 6, an automically tunable control circuit 100 for developing the first and second control signals to energize the controlled switches 21 and 24 in the power circuits to create a condition of vibratory motion in the feeder is shown, and the graphs of the wave forms of signals developed in the control circuit are shown in FIG. 7. The control circuit 100 includes a sensor apparatus 101, for example including a sensor coil 102, that produces a sensed signal indicative of the velocity, frequency, and phase of oscillation of a vibrating device driven by the load 19, for example the electromagnetic coil in a vibratory feeder, which sensed signal is used to control the frequency and phase of the output signals from a voltage controlled oscillator 103. The voltage controlled oscillator may be that referred to above sold by Wavetek to produce a triangular wave output signal 104 (FIG. 7a) and a rectangular wave output signal 105 (FIG. 7b), both signals having the same frequency and in constant phase relation with the former being dependent on the input signal to the voltage controlled oscillator and the latter being such that a positive going pulse in the rectangular wave implies that the triangular wave is "going down" as described above. Alternatively, a well known triangular wave generator 106 coupled to a rectangular wave generator 107 may be used to produce the triangular and rectangular signals.

The voltage controlled oscillator 103 is connected at its first output 108 to a first input 109 of a variable pulse width generator 110, and at its second output 111 to the input 112 of a well known bistable multivibrator flip-flop circuit 113. The flip-flop output 114 is connected to a first input 115 of a phase synchronizer 116, that may be a "D" type data flip-flop 117, which is a well known device, such as the model No. SN54H74 sold by Wavetek. Other devices having similar operational characteristics, whereby the concurrent input of a data signal and a clock signal produces an output signal which terminates only upon receipt of a subsequent clock signal input without a concurrent data signal input regardless of the duration of the data signal, may be substituted for the data flip-flop 117. A conductor 118 also connects the flip-flop output 114 to a second input 119 of the variable pulse width generator 110 as well as to a first input 120 of a phase detector 121, which may include a buffer amplifier 122 connected between the conductor 118 and the gate 123G of a field effect transistor 123, or similar device, that has the drain 123D coupled to an amplifier 124 and the source 123S connected to a low pass filter 125.

The velocity sensor 101 has an output 126 connected to the input 127 of the amplifier 124, for example an operational amplifier having nearly infinite gain, and the output 126 is also connected to another amplifier 128, having for example a gain of minus 50. The output from the latter amplifier is connected to the input 129 of a rectifier 130, and the output 131 of the rectifier is connected to a first input 132 of a summing junction 133, which has a second input 134 connected to an amplitude setting potentiometer 135 at the adjustable wiper 136 thereof. A fixed resistor portion 137 of the potentiometer is connected to a suitable voltage source (not shown).

The output 138 of the summing junction 133 is connected to the input 139 of a well known integrator 140, which may include operational amplifier 141 having a first input 142 connected to ground or common and second input 143 connected to the output of the summing junction. A capacitor 144 is connected from the input 143 to the output 145 of the operational amplifier 141, which is in turn connected to the third input 146 of the variable pulse width generator 110. The variable pulse width generator may include a well known comparator 147 connected at one input 109 to the conductor 108 and at the other input 146 to the integrator 140.

The output 148 from the comparator 147 is coupled to one input 149 of a known AND gate 150 which has another input 151 coupled by the conductor 118 to the output of the flip-flop 113. The output 148 from the comparator 147 is also connected to a second input 152 of the "D" type data flip-flop 117 forming the phase synchronizer 116 to provide a clock pulse thereto. The output 153 from the phase synchronizer 116 is connected to a conductor 154 for connection to one of the controlled switches in the power circuits and the output 155 of the AND gate 150 in the variable pulse width generator 110 is connected to a well known current sensor and limiter 156 with the output 157 thereof being connected to a conductor 158 for connection to the other controlled switch in the power circuits.

The output 159 of the phase detector 121 is connected to a well known integrator 160 which includes an operational amplifier 161 having one input 162 connected to ground or common and the other input connected both to the output from the low pass filter 125 and to a capacitor 163, which is coupled to the output 164 of the operational amplifier. The output of the operational amplifier of the integrator 160 is connected by a conductor 165 to a first input 166 of a summing junction 167, and a second input 168 of the summing junction is connected to an initial frequency setting potentiometer 169 at its adjustable wiper 170, which is coupled to a resistor portion 171 of the potentiometer connected across a suitable voltage source (not shown). The output 172 of the summing junction 167 is connected by a conductor 173 to the input 174 of the voltage controlled oscillator 103, and a main power supply (not shown) provides electric energy to the entire control circuit 100.

Operation of the control circuit 100, which will be described hereinafter with reference to the signal wave forms shown in FIGS. 7 a-f, is commenced, after proper energization by a main power supply (not shown), by adjusting the initial frequency setting potentiometer 169 to a voltage level representative of a frequency close to the resonant frequency of the vibratory feeder to reduce the time required for hunting and seeking the actual resonant frequency thereof and by adjusting the amplitude setting potentiometer 135 to produce a desired amplitude of vibration of the vibratory feeder. Although both potentiometers may be well known manually adjustable potentiometers, the amplitude setting potentiometer 135 may be a condition responsive device, which produces an output signal in response to a given condition, such as the weight of screws contained in the feeder bowl of the vibratory feeder. Also, if desired, the initial frequency setting potentiometer 169 may be eliminated from the control circuit 100 if it is to be operated only fully automatically.

The voltage controlled oscillator 103 produces at its output 108 the triangular signal 104 (FIG. 7a), and at its output 111 the rectangular signal 105 (FIG. 7b) both in phase with the positive pulses of the latter being produced when the former is "going down." The frequency of the triangular and rectangular signals is dependent on the input voltage to the voltage controlled oscillator the derivation of which will be discussed below. The flip-flop 113 divides the frequency of the rectangular signal by two and produces a divided rectangular output signal 175 (FIG. 7c), which has positive going pulses or portions centered about alternate positive peaks of the triangular signal 104.

The velocity sensor 101, which may be any known device for sensing the velocity, change in the velocity, and phase of oscillation of a vibrating object, such as an electro-magnetic coil 102 with a movable central core coupled to the vibratory feeder bowl, produces a sensed output signal responsive to such oscillation, and this sensed signal is amplified in the amplifier 128 and rectified in the rectifier 130. The summing junction 133 combines the signals received at its respective inputs 132, 134 from the rectifier 130 and the amplitude setting potentiometer 135 to produce a combined output signal which is integrated by the integrator 140 resulting in a substantially constant reference voltage level signal Vr (FIG. 7a) representative of the integral of desired amplitude of oscillation minus actual amplitude over time, which signal is fed to the variable pulse width generator 110 for comparison in the comparator 147 with the triangular signal 104.

The variable pulse width generator 110 produces from its three input signals a clock pulse signal 176 (FIG. 7d), which is positive going when the signal 104 is greater in magnitude than the signal Vr and negative going when the signal Vr is greater in magnitude than the signal 104 and a control signal 177. The clock pulse signal 176 is produced at the output 148 of the comparator 147, which may be for example a very high gain operational amplifier that produces an output signal, the clock pulse, according to the conditions previously noted. The AND gate 150 produces the control signal 177 (FIG. 7f) when it receives at its inputs the clock pulse signal 176 and the divided rectangular signal 175, and the current limiter and sensor 156 limits the maximum power level for the control signal 177 as it is transmitted to the second transistor switch in the power circuits.

The "D" type data flip-flop 177 of the phase synchronizer 116 produces the control signal 178 (FIG. 8e) that is positive upon receipt of a clock pulse 176 and a data pulse, i.e., the positive pulse of the divided rectangular signal 175, and is generall zero when a clock pulse occurs without the data pulse. This control signal 178 is then coupled as the control signal to the first transistor switch in the power circuits.

In the phase detector 121 the buffer amplifier 122 shapes the input divided rectangular signal 175 to control operation of the field effect transistor 123, while the very high gain amplifier 124 provides to the drain 123D an input signal indicative of the frequency and phase of oscillation of the vibratory feeder. The phase detector detects the phase angle difference between the vibrating device and the drive signal represented by the divided rectangular signal 175. The output signal from the field effect transistor 123, which is maximum when the gate signal and drain signal are "on" and minimum when one or both of same are off, is filtered in the low pass filter 125 and integrated in known manner in the integrator 160 providing an integral of the phase angle difference or phase error over time. The integrated signal from the integrator 160 is then combined with the signal from the frequency setting potentiometer 169 in the summing junction 167, and is coupled to the input 174 of the triangular wave generator 106 in the voltage controlled oscillator 103.

As the motion detected by the coil 102 of the velocity sensor 101 is periodic, the sensed signal is similarly periodic, preferably having positive and negative portions. Thus the output signal from the very high gain amplifier 124 is periodic, being, for example, positive when the sensed signal is positive and zero when the sensed signal is negative. The phase detector 121 may be such that upon the occurrence of both the divided rectangular signal 175 and the amplified sensed signal, the latter will be passed to the integrator 160 for subsequent application to the voltage controlled oscillator 103 to control the frequency of the output signals 104, 105 therefrom. Thus, the actual frequency of vibration is compared in the phase detector 121 with the frequency of the divided rectangular signal 175 indicative of the frequency of the drive signal 179 to control the voltage controlled oscillator 103 output signal frequency, being an effective feedback circuit to result in the ideal condition of resonant vibratory motion in the vibratory feeder.

Turning now more specifically to FIG. 7, the triangular signal 104 (FIG. 7a) begins at time $t_0$ increasing from zero amplitude toward maximum amplitude that is achieved at time $t_2$ and at which point the positive pulse or portion of the rectangular signal 105 begins (FIG. 7d). At time $t_1$, however, the triangular signal 104 becomes greater in magnitude than the signal Vr, and the clock pulse signal 176 begins; at time $t_3$ the triangular signal 104 magnitude falls below Vr, and the clock pulse signal 176 ends. The rectangular signal 105 ends at time $t_4$ as the triangular 104 touches zero, and the positive portion of the divided rectangular signal 175 begins at that point. At time $t_5$ the triangular signal 104 again crosses Vr, and a clock pulse signal 176 is again initiated, this time, however, during the occurrence of the divided rectangular signal 175. Thus, the control signal 178 (FIG. 7e) is produced at the output of the data flip-flop 117, and the control signal 177 (FIG. 7 f) is produced at the output of the AND gate 150 in the variable pulse width generator 110.

At time $t_6$ the triangular signal 104 crosses Vr on its way toward zero, and both the clock pulse signal 176 and the control signal 177 go to zero. The triangular signal 104 touches zero at time $t_7$, cutting off the rectangular signal 105 as well as the divided rectangular signal 175. At time $t_8$ the triangular signal 104 again becomes greater in magnitude than Vr, thereby initiating the next clock pulse signal 176, which turns off the data flip-flop 117 and the control signal 178 therefrom. This operation is repeated cyclically during proper functioning of the control circuit 100 to control operation of the power circuits that provide the drive signal 179 (FIG. 8) to the load 19 as previously described.

The current flowing through the load 19 in the power circuits as controlled by the control circuit 100 is shown in FIG. 8, the wave form thereof being substantially the same as in FIG. 5. Reading the graphs in FIGS. 7 and 8 from left to right according to passing time, the drive signal current 179 through the load, controlled by the control signals 177, 178 (FIGS. 7e and f), increases as both transistor switches 21, 24 in the power circuit are energized, i.e., when both the divided rectangular signal 175 (FIG. 7c) and the clock pulse signal 176 (FIG. 7d) occur (time $t_5$ until time $t_6$); stops increasing and remains substantially constant upon the termination of the clock pulse signal 176 (FIG. 7d) (time $t_6$ until time $t_8$); and rapidly decreases to zero upon occurrence of the next clock pulse signal 176 without a divided rectangular signal 175 (FIG. 7c) (time $t_8$ until time $t_9$).

Thus, as described above with reference to the manually tuned control circuit 60, the signal from the amplitude setting potentiometer 135 is combined with a signal indicative of the actual amplitude of vibration of the moving vibrator bowl to determine the level of Vr, the duration of each clock pulse signal 176, the duration of each control signal 177, and, accordingly, the duration that the drive signal 188 may increase in magnitude. Further, the signal from the initial frequency setting potentiometer 169 is combined with a signal from the integrator 160 indicative of the frequency and phase of vibration of the vibrator bowl to control the frequency of the signals 104, 105 from the voltage controlled oscillator 103, and accordingly, the frequency of occurrence of the drive signal 179.

Turning now to FIG. 9, a power circuit 195 and a manual or automatic tuning control circuit 196, both having been previously described, are shown connected to provide a drive signal on leads 197, 198 to a solenoid drive coil 199 for producing a driving force associated with a vibratory feeder generally indicated at 200. The coil 199 may be a pick-up and release electro-magnetic device as previously described, or may be a push-pull device. In the latter case the power supply including the power circuit 195 and the control circuit 196 produce an appropriate positive and negative going drive signal. Also, if required, a plurality of coils 199 or other force producing devices may be used. The vibratory feeder 200 includes a vibratory feeder bowl 201 having a vertical side wall 202 and a bottom 203, which is raised at its center portion 204 and slopes down toward the side wall. A helical ramp 205 extends along the side wall 202 from the bottom 203 of the bowl to the top 206 thereof, and an adjustable take-off ramp 207 is connected by bolts 208 and an adjustable support 209 to receive parts climbing up the helical ramp. A stop wall 210 is fixed to the side wall 202 of the bowl to cause any parts not accepted by the take-off ramp 207 to fall to the bottom 203 of the bowl. The underside of the bowl 201 is connected by angled resilient spring mountings 211 to fixed supports 212, two of which are shown although three or more may be used, to permit both vertical and rotary motion of the bowl. A connecting nut 213 holds the bowl 201 to a threaded portion of a drive shaft 214 which is connected at a coupling 215 to the solenoid core 216, and a tab 217 rigidly connected to the outside of the side wall 202 vibrates with the bowl while the motion thereof is detected by a sensor 218 connected to the control circuit 196 as described above.

In operation of the vibratory feeder 200 illustrated in FIG. 9, the control circuit 196 produces an output signal to control operation of the power circuit 195 to produce a periodically varying drive signal. The drive signal is applied to the solenoid drive coil 199, which in response thereto periodically draws the solenoid core 216 downward and then releases same. The motion of the solenoid core 216 is transmitted through the coupling 215 and the drive shaft 214 to the vibratory feeder bowl 201, which upon being drawn in a downward direction causes the spring mountings 211 to bend to result in a clockwise rotation of the bowl. When the solenoid coil 216 is released, the bowl 201 travels upward according to the force exerted by the spring mountings 211, while rotating in a counter-clockwise direction. As the vibratory feeder bowl 201 vibrates and rotates, parts therein tend to move to the outer periphery of the bowl and to climb up the helical ramp 205, thus moving from a first location at the bottom of the bowl to a second location at the top thereof. As a part reaches the top of the ramp, it is received by the adjustable take-off ramp 207 and slides down same to a counter, bagger, or other device (not shown). The vibratory motion of the bowl 201 is detected at the tab 217 by the sensor 218, and a signal therefrom is directed to the control circuit 196, which adjusts the power circuit 195 and drive signal to achieve resonant vibratory motion of the vibratory feeder.

As can now be clearly understood, the invention provides an improved power circuit for energizing a load providing motive force for a mechanical device and a control circuit either manually or automatically tunable to the resonant frequency of the vibrating mechanical device thereby causing same to vibrate at resonance.

The embodiments of the invention in which an exclusive property or privilege is claimed are defined as follows:

1. A control circuit for providing first and second control signals comprising variable frequency oscillator means for producing first and second output signals at a frequency determined by an input signal thereto, such first and second output signals maintaining substantially constant phase relation, and such first output signal also forming one of the control signals, and variable pulse width generator means for producing from such first and second output signals and a reference input signal the other one of the control signals.

2. A control circuit for providing first and second control signals as set forth in claim 1 wherein said variable pulse width generator means comprises comparator means coupled to receive such second output signal and such reference input signal for comparing same and producing a compared signal indicative of such comparison, and AND gate means coupled to receive such first output signal and such compared signal for producing upon the occurrence of both the other one of the control signals.

3. A control circuit for providing first and second control signals as set forth in claim 2 wherein said comparator means comprises means for producing such compared signal only when such second output signal is greater in magnitude than such reference input signal.

4. A control circuit for providing first and second control signals as set forth in claim 1 wherein said variable frequency oscillator means comprises voltage controlled oscillator means, and said control circuit further comprises adjustable potentiometer means for providing such input signal to said voltage controlled oscillator means.

5. A control circuit for providing first and second control signals as set forth in claim 1 further comprising adjustable potentiometer means for providing such reference input signal to said variable pulse width generator means.

6. A control circuit for providing first and second control signals for application to create a condition comprising variable frequency oscillator means for producing first and second output signals at a frequency determined by an input signal thereto, such first and second output signals maintaining substantially constant phase relation, means for dividing the frequency of such first output signal by two to produce a divided first output signal, variable pulse width generator means for producing from such divided first output signal, such second output signal and a reference input signal one of the control signals and a clock pulse signal, sensor means for producing a periodically varying sensed signal indicative of the condition, such sensed signal forming such reference input signal, synchronizer means for producing from inputs of such divided first output signal and such clock pulse signal the other one of the control signals at least partially in phase with the latter, and phase detector means for producing from such sensed signal and divided first output signal at least a portion of such input signal to said variable frequency oscillator means for controlling the frequency of such first and second output signals.

7. A control circuit for providing first and second control signals for application to create a condition as set forth in claim 6 wherein said variable frequency oscillator means comprises a voltage controlled oscillator.

8. A control circuit for providing first and second control signals for application to create a condition as set forth in claim 6 wherein said variable frequency oscillator means comprises a triangular wave oscillator and a rectangular wave generator, the former producing a triangular signal forming such first output signal at a frequency determined by such input signal thereto, and the latter producing a rectangular signal forming such first output signal in response to such triangular signal.

9. A control circuit for providing first and second control signals for application to create a condition as set forth in claim 6 wherein said means for dividing comprises bistable multivibratory flip-flop means.

10. A control circuit for providing first and second control signals for application to create a condition as set forth in claim 6 wherein said synchronizer means comprises a data flip-flop circuit whereby upon the concurrent occurrence of such divided first output signal and clock pulse signal inputs the other one of the control signals occurs and upon the next occurrence of such clock pulse signal input without occurrence of such divided first output signal input the control signal ceases to occur.

11. A control circuit for providing first and second control signals for application to create a condition as set forth in claim 6 wherein said variable pulse width generator means comprises comparator means receiving such second output signal and such reference input signal for producing therefrom such clock pulse signal, and AND gate means receiving such clock pulse signal and such divided first output signal for producing upon occurrence of both such one of the control signals.

12. A control circuit for providing first and second control signals for application to create a condition as set forth in claim 11 further comprising adjustable means for producing such reference input signal.

13. A control circuit for providing first and second control signals for application to create a condition as set forth in claim 6 wherein said phase detector means comprises switch means operable in response to occurrence of such divided first output signal to pass such sensed signal to said variable frequency oscillator as the input signal thereto.

14. A control circuit for providing first and second control signals for application to create a condition as set forth in claim 13 wherein said phase detector means comprises field effect transistor means.

15. A control circuit for providing first and second control signals for application to create a condition as set forth in claim 13 further comprising adjustable means for producing such input signal for said variable frequency oscillator means.

16. A variable frequency electric power supply comprising power circuit means and control circuit means for controlling operation of said power circuit means; said power circuit means including individually operable first and second controlled switch means for controlling application of energy to a load, said switch means having conducting and non-conducting states, and means for permitting energy stored in the load to flow therethrough when one of said switch means is non-conducting; said control circuit including variable frequency oscillator means for producing first and second output signals at a frequency determined by an input signal thereto, such first and second output signals maintaining substantially constant phase relation and such first output signal also forming a first control signal, and variable pulse width generator means for producing from such first and second output signals and a reference input signal a second control signal; and means for connecting said control circuit means to said power circuit means to provide said first and second control signals to said respective first and second controlled switch means for operating same.

17. A variable frequency electric power supply as set forth in claim 16 wherein the load comprises an inductive load, and said means for permitting comprises diode means.

18. A variable frequency electric power supply as set forth in claim 17 further comprising means coupled in said power circuit for recovering energy stored in the load when both said first and second control switch means are non-conducting.

19. A variable frequency electric power supply comprising power circuit means and control circuit means for controlling operation of said power circuit means; said power circuit means including individually operable frist and second controlled switch means for controlling application of energy to a load, said switch means having conducting and non-conducting states, and means for permitting energy stored in the load to flow therethrough when one of said switch means is non-conducting; said control circuit including variable frequency oscillator means for producing first and second output signals at a frequency determined by an input signal thereto, such first and second output signals maintaining substantially constant phase relation, means for dividing the frequency of such first output signal by two to produce a divided first output signal, variable pulse width generator means for producing from such divided first output signal, such second output signal and a reference input signal a first control signal and a clock pulse signal, sensor means for producing a periodically varying sensed signal indicative of the condition of a device operable in response to the load, such sensed signal forming at least a portion of such reference input signal, synchronizer means for producing from inputs of such divided first output signal and such clock pulse signal a second control signal at least partially in phase with the latter, and phase detector means for producing from such sensed signal and divided first output signal at least a portion of such input signal to said variable frequency oscillator means for controlling the frequency of said first and second output signals; and means for coupling said control circuit means to said power circuit means to provide said first and second control signals to said respective first and second controlled switch means for controlling operation of same.

20. A variable frequency electric power supply as set forth in claim 19 wherein the load comprises an inductive load, said means for permitting comprises diode means, and said power circuit further comprises means for recovering energy stored in the load when both said first and second controlled switch means are non-conducting.

* * * * *

UNITED STATES PATENT OFFICE
CERTIFICATE OF CORRECTION

Patent No. 3,864,618                    Dated February 4, 1975

Inventor(s)  Peter W. Hammond

It is certified that error appears in the above-identified patent and that said Letters Patent are hereby corrected as shown below:

On the cover sheet [73] Assignee should read -- Cyberex, Inc. Willoughby, Ohio --.

Signed and sealed this 10th day of June 1975.

(SEAL)
Attest:

RUTH C. MASON
Attesting Officer

C. MARSHALL DANN
Commissioner of Patents
and Trademarks